United States Patent [19]

Miyamaru et al.

[11] Patent Number: 4,925,432
[45] Date of Patent: May 15, 1990

[54] BELT-TYPE CONTINUOUSLY VARIABLE TRANSMISSION AND ENGINE SPEED CONTROL DEVICE THEREFORE

[75] Inventors: Yukio Miyamaru; Akio Yagasaki, both of Tokyo; Shigeo Kimura; Yoshimi Osanai, both of Saitama, all of Japan

[73] Assignee: Honda Giken Kogyo Kabushiki Kaisha, Tokyo, Japan

[21] Appl. No.: 244,003

[22] Filed: Sep. 14, 1988

[30] Foreign Application Priority Data

Sep. 25, 1987 [JP] Japan .................................. 62-241898
Nov. 6, 1987 [JP] Japan .................................. 62-280394

[51] Int. Cl.$^5$ ............................................. F16H 11/02
[52] U.S. Cl. .......................................... 474/8; 474/11; 474/69

[58] Field of Search .................. 474/8, 11, 12, 13, 17, 474/18, 69, 70, 73, 74; 192/0.04, 0.048, 0.07, 0.084, 3.51, 3.52, 3.54

[56] References Cited

U.S. PATENT DOCUMENTS 4,515,575  5/1985  Kinbara et al. ...................... 474/11

FOREIGN PATENT DOCUMENTS 1010822  11/1965  United Kingdom .

Primary Examiner—Thuy M. Bui
Attorney, Agent, or Firm—Lyon & Lyon

[57] ABSTRACT

A belt-type continously variable transmisison having an automatic clutch is provided with fixed and variable pulley elements on the driving pulley so configured as to permit some degree of slippage upon clutch engagement. Also disclosed is an engine speed control system particularly adapted for utilization with the described transmission.

11 Claims, 9 Drawing Sheets

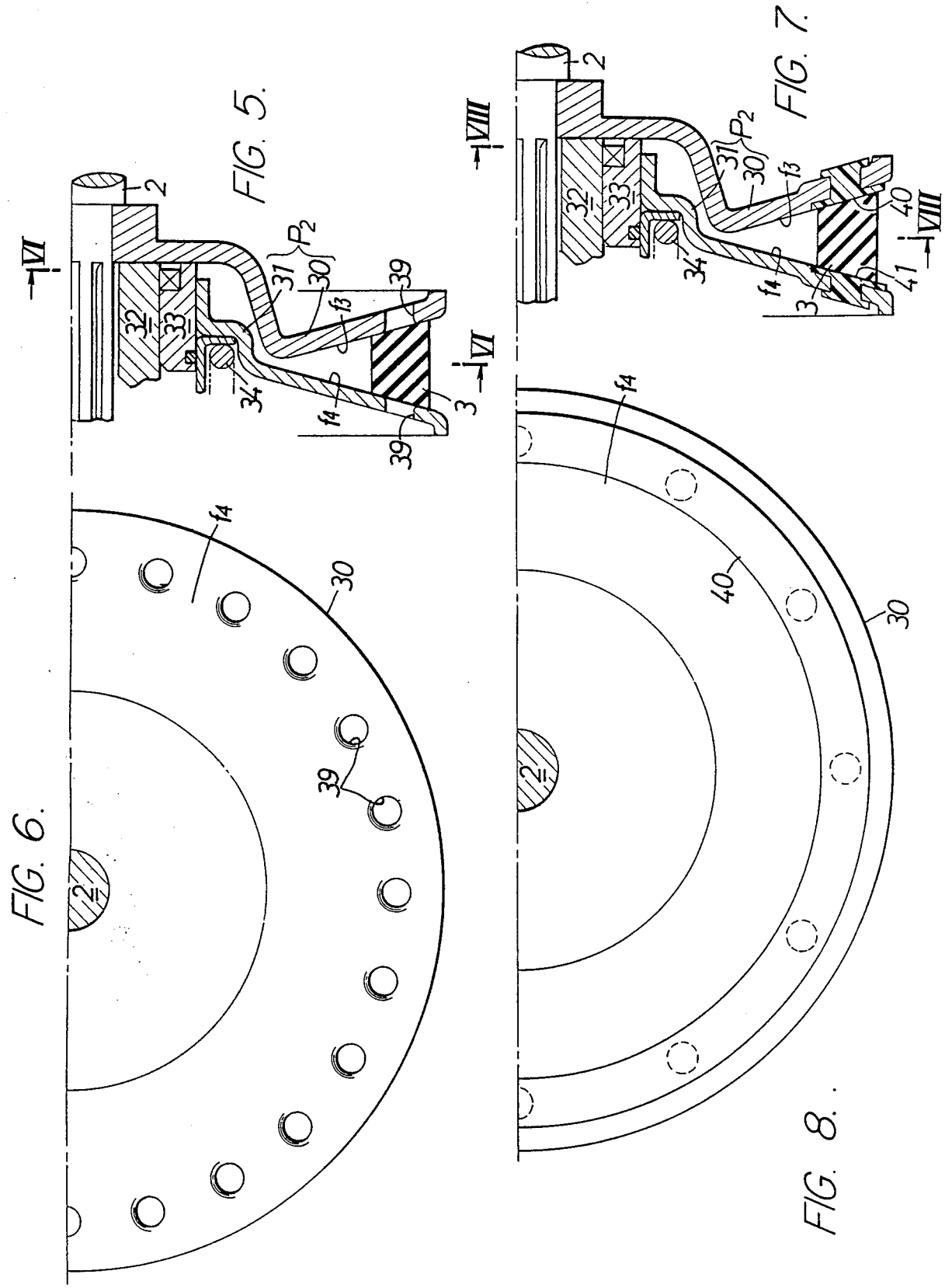

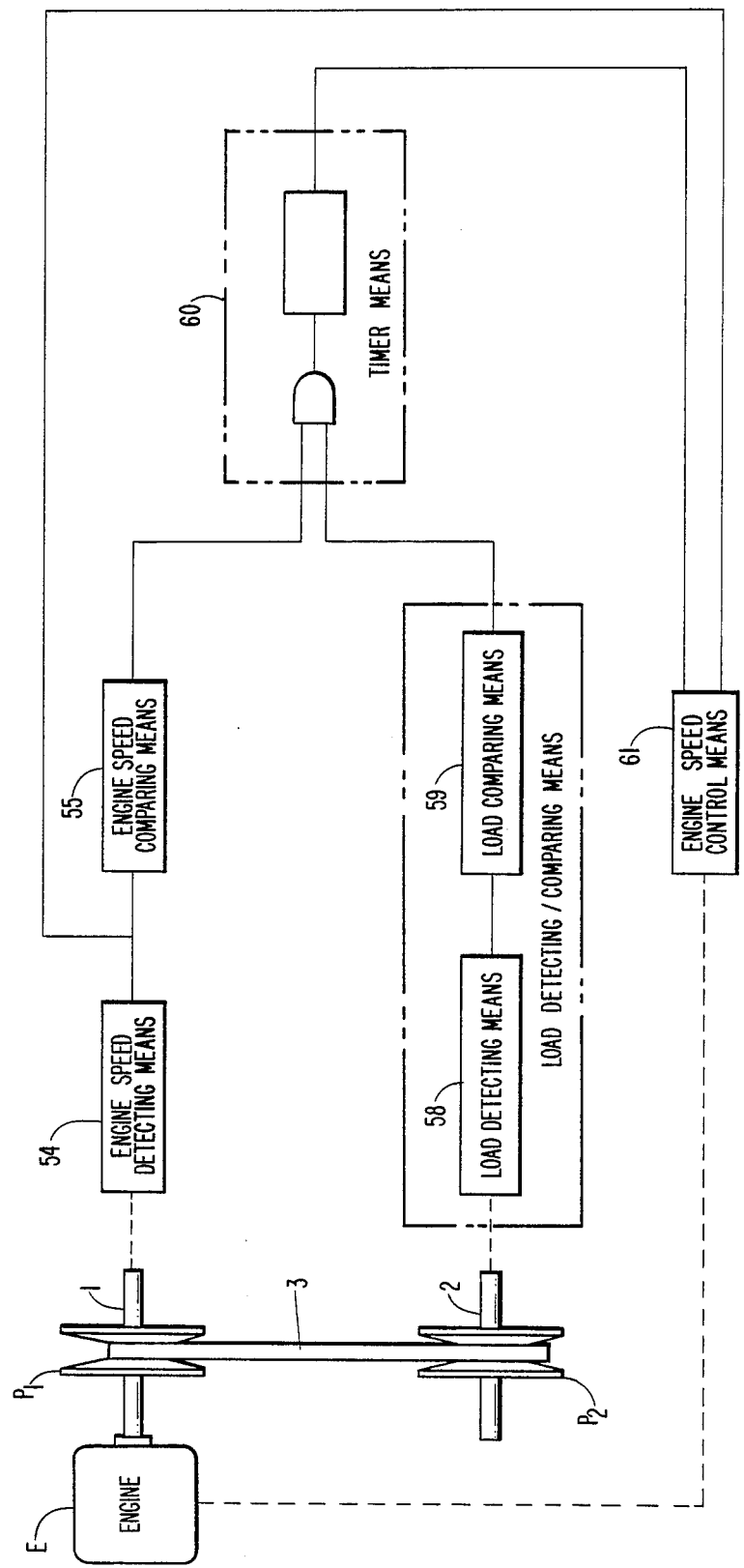

BELT-TYPE CONTINUOUSLY VARIABLE TRANSMISSION AND ENGINE SPEED CONTROL DEVICE THEREFORE

BACKGROUND OF THE INVENTION

The present invention relates to a belt-type continuously variable transmission having an automatic clutch and to an engine speed control device for an engine rotating a drive shaft via such variable speed transmission.

A belt-type continuously variable transmission having an automatic clutch in a driving variable-diameter V-pulley is known, for example, from British Patent No. 1010822. In the driving variable-diameter V-pulley provided with an automatic clutch, such as is described in this British patent, a movable pulley element is controlled to slide axially by the resilient force of a clutch spring and the centrifugal force applied to a centrifugal weight whereby a frictional contact conical surface of the movable pulley element is brought into contact with, or separated from, an endless V-belt, so that the automatic clutch, consequently, becomes engaged or disengaged. Upon engagement of the clutch, where the movable pulley element comes into contact with the endless V-belt, the frictional contact surface of the movable pulley element instantaneously catches the endless V-belt to violently engage the clutch. As a result, there occurs a large shock upon engagement of the clutch. In the case of applying this belt-type continuously variable transmission to a motorcycle, for example, the "clutch-on" feeling is deteriorated.

Accordingly, it is an object of the present invention to provide a belt-type continuously variable transmission which can solve the above problem by positively generating a slight amount of slippage in the frictional contact surfaces between the movable pulley element of the driving variable-diameter V-pulley and the endless V-belt and between the movable pulley element of the driven variable-diameter V-pulley and the endless V-belt.

Furthermore, a known engine speed control device is designed to control engine speed by opening or closing a throttle and adjusting suction of air flow. When such conventional engine speed control device is applied to an engine rotating the drive shaft of a belt-type, continuously variable, transmission including variable-diameter V-pulleys mounted on the drive shaft and the driven shaft, respectively, and an endless V-belt wound around both V-pulleys, there occurs the following problem. As the power of the engine is transmitted by a frictional force generated between both the V-pulleys and the endless V-belt, there is naturally generated slippage between both the V-pulleys and the endless V-belt. Particularly, when load applied to the driven shaft becomes greater than the power transmitting force, the power cannot be transmitted from the drive shaft to the driven shaft. Such a stall condition continues until the throttle is operated to close. Under the stall condition, the slippage is maximum to cause acceleration of unbalanced wear of the endless V-belt. This problem is serious, particularly when using a so-called belt clutch effecting contact and non-contact between the V-pulley and the V-belt without the provision of a dedicated clutch for transmitting and cutting the power of the engine.

The present invention has been achieved to solve the above problem, and it is an object of the present invention to provide an engine speed control device adapted to prevent the duration of the stall condition for an extended period of time, in addition to an engine speed control device for controlling the engine speed in response to the throttle opening and closing operation.

SUMMARY OF THE INVENTION

According to one aspect of the present invention, there is provided in a belt-type continuously variable transmission including a driving variable-diameter V-pulley provided with a fixed pulley element and a movable V-pulley provided with a fixed pulley element and a movable pulley element on a driven shaft, an endless V-belt wound around said V-pulleys, and a clutch spring provided in said driving variable-diameter V-pulley for biasing said movable pulley element in such a direction as to move away from said endless V-belt to define a clutch gap between contact surfaces of said movable pulley element and said endless V-belt; the improvement wherein the frictional contact area between said driving and driven variable-diameter V-pulleys and said endless V-belt comprise a clutch operation portion for effecting clutch control between said V-pulleys and said endless V-belt and a speed change operation portion for effecting speed change control between said V-pulleys and said endless V-belt, and wherein the clutch operation portion generates slippage more easily than the speed change operation portion.

When the drive shaft is rotated by operating the engine, and the rotational speed of the drive shaft is gradually increased, centrifugal force applied to plural weights in the driving pulley is gradually increased to move the weights radially outwardly in weight receiving chambers. As a result, the movable pulley element is moved toward the fixed pulley element against the biasing force of the clutch spring until a friction surface of the movable pulley element comes into contact with the side surface of the V-belt. Thus, the V-belt is sandwiched between the fixed and movable pulley elements, and the rotation of the fixed and movable pulley elements is transmitted to the endless V-belt, thus effecting a "clutch-on" condition. Accordingly, the torque of the drive shaft is transmitted through the driving V-pulley and the endless V-belt to the driven V-pulley, and is then transmitted through the driven shaft to a reduction gear mechanism to a rear wheel. When the rotational speed of the drive shaft increases, the centrifugal force applied to the weights is increased to further move the weights radially outwardly in the weight receiving chambers and resultantly allow the movable pulley element to be moved further toward the fixed pulley element. Contrariwise, when the rotational speed of the drive shaft decreases, the centrifugal force applied to the weights is decreased to move the weights radially inwardly in the weight receiving chambers and resultantly allow the movable pulley element to be moved away from the fixed pulley element. Accordingly, a change in rotational speed of the drive shaft causes a change in the contact position of the endless V-belt with respect to the drive and driven V-pulleys, thereby automatically changing the speed ratio of the continuously variable transmission and transmitting the torque of the drive shaft to the driven shaft.

In the arrangement described herein the elements of the driving pulley each contain a radially inner vertical surface portion and a radially outer conical surface portion whereby upon engagement of the clutch, the boundary portions between the vertical surface and the conical surface of the friction surface of the driving fixed pulley element and between the vertical surface and the conical surface of the friction surface of the driving movable pulley element are opposed to the opposite side surfaces of the endless V-belt. Therefore, only the conical surfaces come into contact with the side surfaces of the endless V-belt. That is, the contact area between the conical surfaces and the side surfaces of the endless V-belt is radially reduced upon engagement of the clutch. Accordingly, the frictional torque to be transmitted from the V-pulley to the V-belt upon engagement of the clutch is smaller than that in the speed change region after engagement of the clutch. As a result, the contact surface between the V-pulley and the V-belt is easily slipped upon engagement of the clutch as compared with in the speed change region after engagement of the clutch. On the other hand, upon engagement of the clutch, the fixed and movable pulley elements of the driven variable-diameter V-pulley are engaged with the opposite side surfaces of the V-belt at the outer peripheral portion where slippage is easily generated. Accordingly, the contact area between the pulley elements and the V-belt is radially reduced. As a result, the frictional torque to be transmitted from the V-belt to the driven V-pulley upon engagement of the clutch is smaller than that in the speed change region after engagement of the clutch. Accordingly, the contact surface between the V-pulley and the V-belt is easily slipped upon engagement of the clutch as compared with in the speed change region after engagement of the clutch.

Thus, the shifting from a no-load condition to a load condition of the belt-type continuously variable transmission, that is, the shifting from a "clutch-off" condition to a "clutch-on" condition is smoothly carried out without shock via a semi-engaged clutch condition where slight slippage is generated between the drive and driven variable-diameter V-pulleys and the endless V-belt.

According to another aspect of the present invention, there is provided in an engine speed control device for an engine rotating a drive shaft of a belt-type continuously variable transmission including a driving, variable-diameter V-pulley mounted on said drive shaft, a driven, variable-diameter V-pulley mounted on a driven shaft and an endless V-belt wound around said V-pulleys; the improvement comprising an engine speed detecting means for detecting the speed of said engine; an engine speed comparing means adapted to output a signal when the speed of said engine according to the output of said engine speed detecting means is not less than a set value; a load detecting/comparing means adapted to output a signal when the load applied to said driven shaft is not less than a set value; a timer means adapted to output a signal when the signals from said engine speed comparing means and said load detecting/comparing means are input thereto for a period of time not less than a set time; and an engine speed control means for controlling the speed of said engine according to the output from said engine speed detecting means and the output from said timer means, wherein, when the speed of said engine and the load of said driven shaft continue to exceed the respective set values for a period of time not less than the set time, the engine speed of said engine is controlled to a predetermined value.

In a first embodiment of this aspect of the present invention, the signal from the load detecting/comparing means is output when the rotating speed of the driven shaft is not greater than a set value. In a second preferred embodiment of this aspect of the present invention, the signal from the load detecting/comparing means is output when a braking device for the driven shaft is operated.

In the engine speed control device of the present invention as mentioned above, the engine power is transmitted from the drive shaft to the driven shaft by the frictional force generated between the driving variable-diameter V-pulley mounted on the drive shaft and the driven variable-diameter V-pulley mounted on the driven shaft by the endless V-belt wound around the V-pulleys. Contact areas between both the V-pulleys and the endless V-belt vary in radius with rotating speeds of the drive shaft and the driven shaft, thereby effecting continuous speed change operation. Even when a speed ratio of the continuously variable transmission is a low ratio, that is, when the radius of the contact area between the driving variable-diameter V-pulley and the endless V-belt is near a minimum, and the radius of the contact area between the driven variable-diameter V-pulley and the endless V-belt is near a maximum, and when the load applied to the driven shaft exceeds the power transmitting force, the engine power is not transmitted from the drive shaft to the driven shaft, but, instead, a stall condition is generated. The engine speed control device of the present invention is provided with an engine speed detecting means for detecting the engine speed, an engine speed comparing means adapted to output a signal according to the output from the engine speed detecting means when the engine speed is not less than a set value, and a load detecting/comparing means adapted to output a signal when the load applied to the driven shaft is not less than a set value. Accordingly, when the signals from both the engine speed comparing means and the load detecting/comparing means are simultaneously output, the generation of a stall condition is detected. Furthermore, the engine speed control device of the present invention is also provided with a timer means adapted to output a signal when the signals from both the engine speed comparing means and the load detecting/comparing means are input thereto for a period of time not less than a set time, and engine speed control means for controlling the engine speed according to the outputs from the engine speed detecting means and the timer means. Accordingly, when the stall condition continues for a period of time not less than the set time, the engine speed is controlled to a low speed by the engine speed control means according to the outputs from the engine speed detecting means and the timer means. The control of the engine speed continues to be so conducted until the engine speed decreases to a value less than the set value, or the load decreases to a value less than the set value.

The load detecting/comparing means may be activated by any suitable means functioning to output a signal when the load is not less than the set value. For instance, it may comprise a load detecting means and a load comparing means. Further, the timing means may comprise any suitable means functioning to output a signal when the output signals from the engine comparing means and the load detecting/comparing means continue to be input thereto for a period of time not less than the set time. For instance, the timer means may comprise an AND means and a counter means.

In a first preferred embodiment of an engine speed control device according to the present invention, the load detecting/comparing means outputs a signal indicating that the load is not less than a set value when the rotating speed of the driven shaft is not greater than a set value. Accordingly, when load is applied to the driven shaft to reduce the rotating speed of the driven shaft to a value not greater than the set value, the load detecting/comparing means outputs a signal to thereby detect the stall condition.

In a second preferred embodiment of the engine speed control device according to the present invention, the load detecting/comparing means outputs a signal indicating that the load is not less than a set value when the braking device for the driven shaft is operated. Accordingly, when the load applied to the driven shaft is not less than the set value by the operation of the braking device, the stall condition is detected.

For a better understanding of the invention, its operating advantages and the specific objectives obtained by its use, reference should be made to the accompanying drawings and description which relate to the preferred embodiments thereof.

BRIEF DESCRIPTION OF THE DRAWINGS

FIG. 5 is a partial sectional view of the driven variable diameter V-pulley in a second preferred embodiment of the present invention;

FIG. 6 is a sectional view taken along line VI—VI of FIG. 5;

FIG. 7 is a partial sectional view of a driven variable diameter V-pulley in a third preferred embodiment of the present invention;

FIG. 8 is a sectional view taken along line VIII—VIII of FIG. 7;

FIG. 9 is a block diagram schematic representation of the engine control system according to the present invention;

DESCRIPTION OF PREFERRED THE EMBODIMENTS

Figure 1:
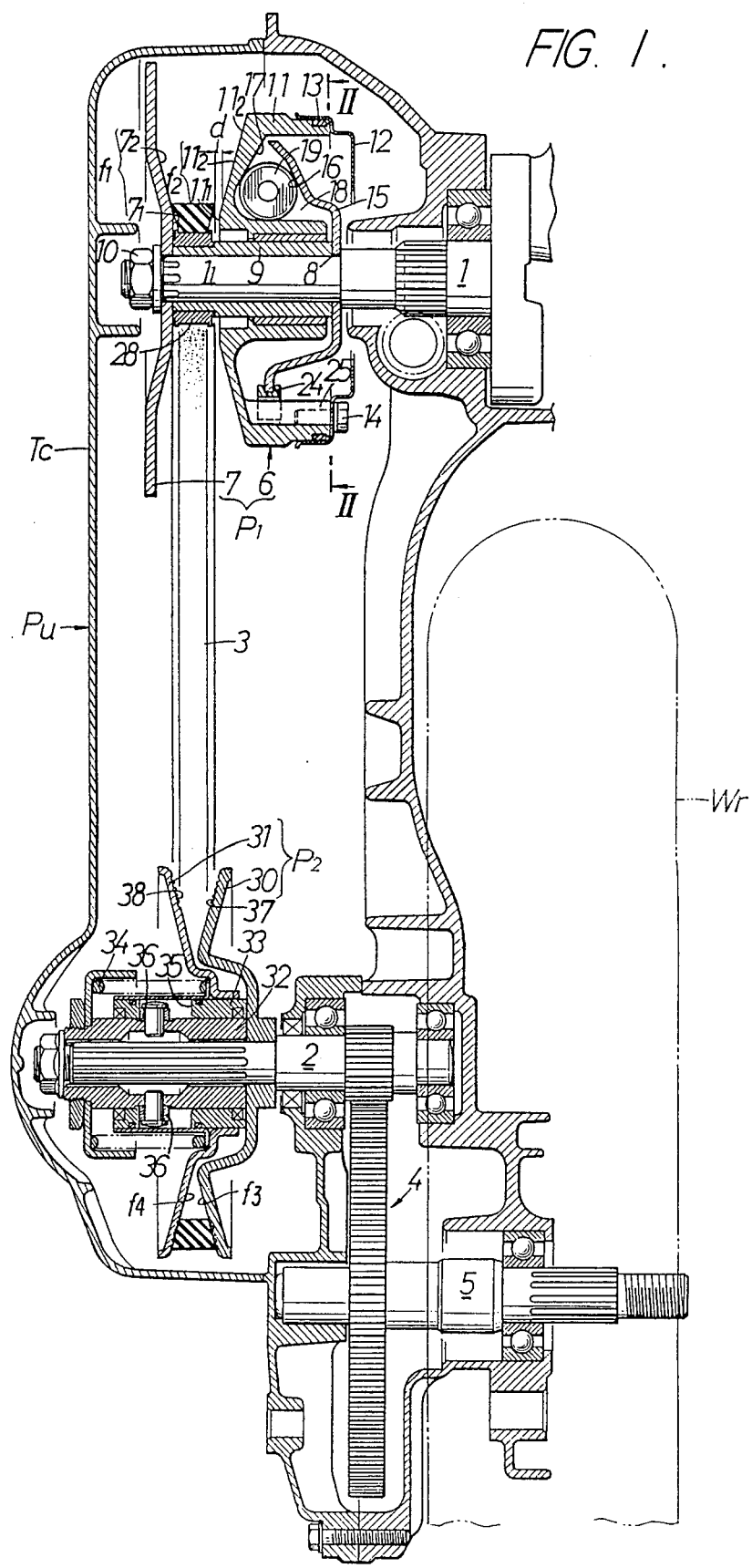
FIG. 1 is a sectional plan view of a belt-type variable transmission according to the present invention.

In the first embodiment of the present invention in FIGS. 1 to 4, the continuously variable transmission of the present invention is applied to a driving power unit Pu of a motorcycle. The continuously variable transmission is mounted in a transmission case Tc of the power unit Pu so as to transmit engine power to a rear wheel Wr.

A driving variable-diameter V-pulley $P_1$ is provided at one end of a crankshaft, or drive shaft, 1 of an engine, while a driven variable-diameter V-pulley $P_2$ is mounted on a driven shaft 2 rotatably supported by the transmission case Tc. An endless V-belt 3 is wound around the driving variable-diameter V-pulley $P_1$ and the driven variable-diameter V-pulley $P_2$. Thus, the belt-type continuously variable transmission of the present invention is comprised of the V-pulleys $P_1$ and $P_2$ and the endless V-belt 3. The driven shaft 2 is connected through a reduction gear mechanism 4 to a rear axle 5 rotatably supported by the transmission case Tc. The rear wheel Wr is supportedly connected to the rear axle 5.

The driving variable-diameter V-pulley $P_1$ consists of a movable pulley element assembly 6 and a fixed pulley element 7. The movable pulley element assembly 6 is supported by the drive shaft 1, and the fixed pulley element 7 is fixed to an outer end of the drive shaft 1 outside the movable pulley element assembly 6. The drive shaft 1 is formed with a shoulder 8 and a small-diameter portion 11 at the outer end portion outside the shoulder 8. A sleeve 9 is engaged with the small-diameter portion $1_1$, and the disc-like fixed pulley element 7 is splined with the small-diameter portion $1_1$ outside the sleeve 9. The sleeve 9 and the fixed pulley element 7 are fixed to the drive shaft 1 by a nut 10 threadedly engaged with the outer end of the small-diameter portion 11. As clearly shown in FIG. 1A, the fixed pulley element 7 has a friction surface $f_1$ frictionally contacting the endless V-belt 3, which friction surface $f_1$ consists of a vertical surface $7_1$ substantially perpendicular to the axis of rotation of the fixed pulley element 7 and a conical surface $7_2$ continuing from the radially outer periphery of the vertical surface $7_1$.

The movable pulley element assembly 6 is supported on the sleeve 9. The movable pulley element assembly 6 is constructed in the following manner. A dish-like movable pulley element 11 is axially slidably engaged with the sleeve 9. As clearly shown in FIG. 1A, the movable pulley element 11 has a friction surface $f_2$ frictionally contacting the endless V-belt 3 and opposed to the friction surface $f_1$ of the fixed pulley element 7. The friction surface $f_2$ consists of a vertical surface $11_1$ substantially perpendicular to the axis of rotation of the movable pulley element 11 and a conical surface $11_2$ continuing from the radially outer periphery of the vertical surface $11_1$.

A seal cover 12 is fixed by plural bolts 14 to the open end surface of the dish-like movable pulley element 11 in such a manner as to cover at least the outer periphery at the open end. A seal ring 13 is interposed between the inner peripheral surface of the seal cover 12 and the movable pulley element 11. There is thus defined an annular lubricating oil chamber between the seal cover 12 and the movable pulley element 11, so that a lubricating oil such as grease can be stored in the lubricating oil chamber.

A ramp plate 15 is fixed between the sleeve 9 and the shoulder 8 of the drive shaft 1. An outer peripheral edge of the ramp plate 15 is disposed in the vicinity of the inner peripheral surface of the movable pulley element 11.

Figure 1A:
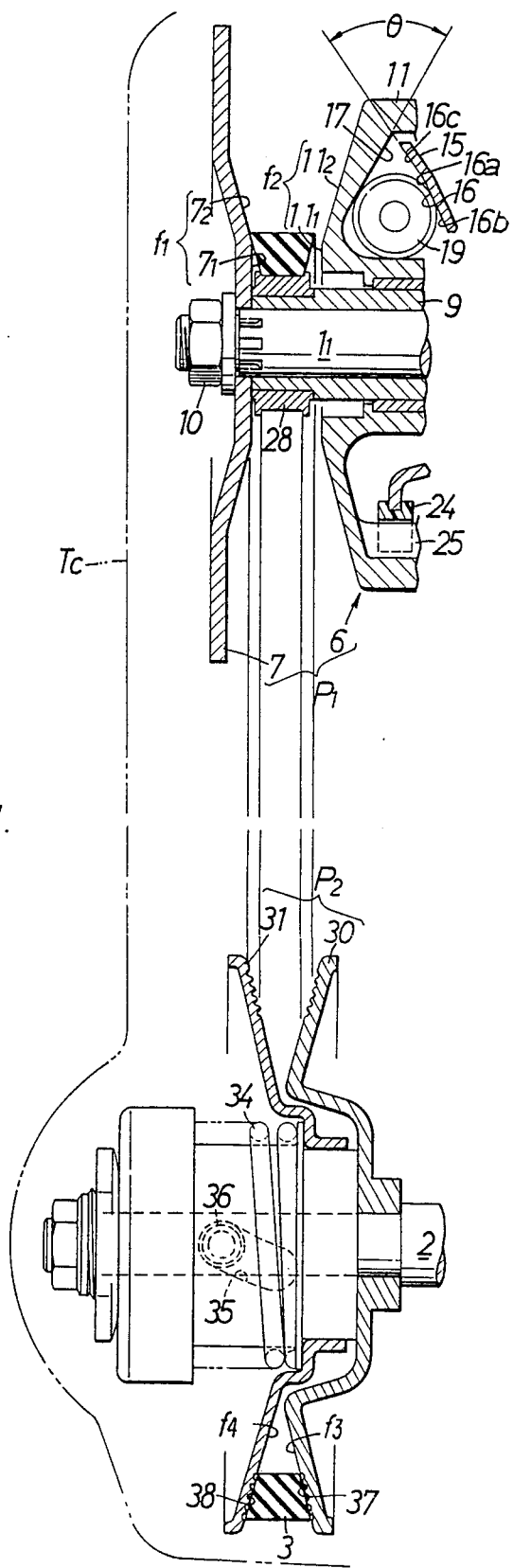
FIG. 1A is an enlarged partial view of the parts illustrated in FIG. 1.
Figure 2:
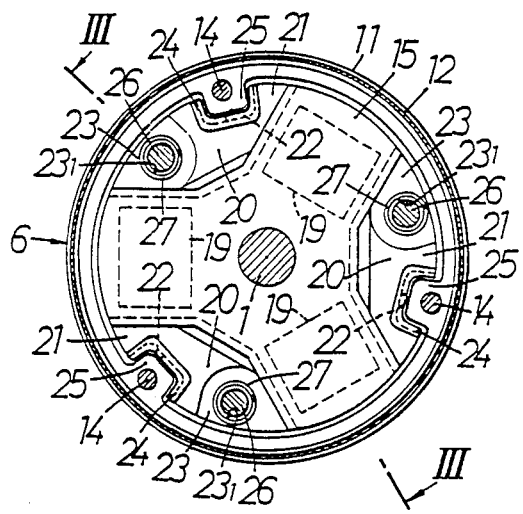
FIG. 2 is a sectional view taken along line II—II of FIG. 1.

The ramp plate 15 is formed with three weight supporting surfaces 16 extending radially outwardly and disposed at circumferentially equal intervals as shown in FIG. 2. The weight supporting surfaces 16 are inclined toward the inner surface of the movable pulley element 11. As shown in FIG. 1A, each weight supporting surface 16 consists of a bent portion 16a formed at a radially intermediate position of the surface 16, an inner supporting surface 16b formed radially inside the bent portion 16a, and an outer supporting surface 16c formed radially outside the bent portion 16a. The angle of inclination of the outer supporting surface 16c is greater than that of the inner supporting surface 16b. On the other hand, the movable pulley element 11 is formed with three weight supporting surfaces 17 opposed to the weight supporting surfaces 16 of the ramp plate 15. The weight supporting surfaces 17 are inclined toward the ramp plate 15. Thus, both the weight supporting surfaces 16 and 17 define a plurality of weight receiving chambers 18 gradually narrowed radially outwardly for receiving a plurality of roller weights 19 therein. Each roller weight 19 is held between the opposed weight supporting surfaces 16 and 17. As shown in FIG. 1A, the angle between the outer supporting surface 16c and the supporting surface 17, namely, the wedge angle $\theta$, is so set as to enhance a wedge effect by the weights 19.

As shown in FIG. 2, the ramp plate 15 is formed at its outer peripheral portion between the weight receiving chambers 18 with a plurality of recesses 20 bent toward the movable pulley element 11. Each recess 20 has a bottom wall 21 extending radially outwardly to the vicinity of the inner surface of the movable pulley element 11. The bottom wall 21 is formed with a U-shaped groove 22 opened to the outer periphery of the ramp plate 15 and with a spring seat 23 having a pin hole $23_1$. The U-shaped groove 22 and the spring seat 23 are located at a circumferential space. A slide piece 24 is engaged with the U-shaped groove 22. On the other hand, a plurality of guide projections 25 are formed on the inner surface of the movable pulley element 11 at circumferentially equal intervals. Thus, the slide piece 24 is slidably engaged with each guide projection 25 in such a manner as to straddle the latter. With this structure, the slide pieces 24 are guided by the respective guide projections 25 to allow the movable pulley element 11 to be axially slidable relative to the ramp plate 15 without relative rotation.

Figure 3:
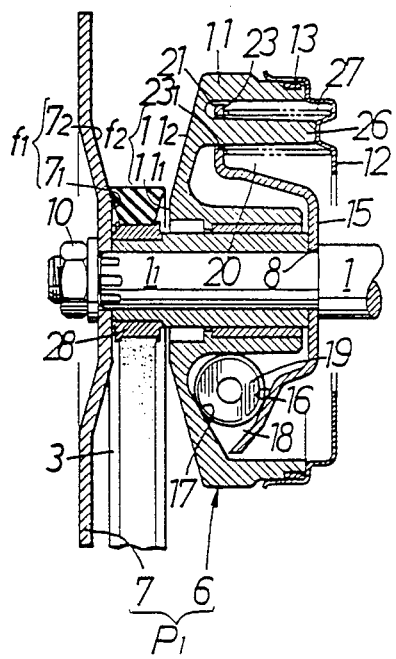
FIG. 3 is a sectional view taken along line III—III of FIG. 2.

As clearly shown in FIG. 3, a guide pin 26 projects from the inner surface of the movable pulley element 11, and is inserted through each pin hole $23_1$. The guide pins 26 axially extend from the movable pulley element 11 with their ends abutting against the seal cover 12. A clutch spring 27, such as a compression coil spring, is so mounted as to surround the guide pin 26 in such a manner that one end of the clutch spring 27 is engaged with the spring seat 23 of the recess 20 of the ramp plate 15 and the other end is engaged with the seal cover 12. Accordingly, the movable pulley element 11 is biased by the resilient force of the clutch spring 27 in such a direction as to be moved away from the fixed pulley element 7.

A collar 28 is rotatably supported on the sleeve 9 between the fixed pulley element and the movable pulley element 11. The endless V-belt 3 is supported on the outer periphery of the collar 28. The endless V-belt 3 has opposite side surfaces opposed to the friction surfaces $f_1$ and $f_2$ of the fixed and movable pulley elements 7 and 11. When the drive shaft 1 is not rotated or is at idling, the opposite side surfaces of the endless V-belt 3 are opposed to a boundary portion between the vertical surface $7_1$ and the conical surface $7_2$ of the friction surface $f_1$ of the fixed pulley element 7 and a boundary portion between the vertical surface $11_1$ and the conical surface $11_2$ of the friction surface $f_2$ of the movable pulley element 11. There is thus defined a clutch gap d between one of the opposite side surfaces of the endless V-belt 3 and the movable pulley element 11 by the resilient force of the clutch spring 27, thus maintaining a "clutch off" condition.

The driven variable-diameter V-pulley $P_2$ is supported on the driven shaft 2. The V-pulley $P_2$ consists of a fixed pulley element 30 and a movable pulley element 31. The fixed pulley element 30 is fixed by means of a sleeve 32 to the driven shaft 2. The movable pulley element 31 is integrally connected to the pulley shaft 33, which is axially slidably supported on the sleeve 32. A pulley spring 34 is mounted around the pulley shaft 33, so as to bias the movable pulley element 31 toward the fixed pulley element 30. The pulley shaft 33 is formed with roller grooves 35 for receiving rollers 36 supported by the sleeve 32. The rollers 36 rollingly engage the roller grooves 35.

The fixed and movable pulley elements 30 and 31 have conical friction surfaces $f_3$ and $f_4$, respectively, between which the endless V-belt 3 is held by the resilient force of the pulley spring 34. The friction surfaces $f_3$ and $f_4$ of the fixed and movable pulley elements 30 and 31 are formed at their outer peripheral portions with a plurality of concentric annular grooves 37 and 38. Under a no-load condition where power is not transmitted from the driving variable-diameter V-pulley $P_1$ to the endless V-belt 3 as shown in FIGS. 1 and 1A, the opposite side surfaces of the endless V-belt 3 face the outer peripheral portions of the friction surfaces $f_3$ and $f_4$ where the annular grooves 37 and 38 are formed. The annular grooves 37 and 38 serve to facilitate sliding of contact surfaces between the fixed and movable pulley elements 30 and 31 and the endless V-belt 3, so that a frictional torque to be transmitted from the endless V-belt 3 to the driven variable-diameter pulley $P_2$ upon engagement of the clutch may be reduced.

Figure 4:
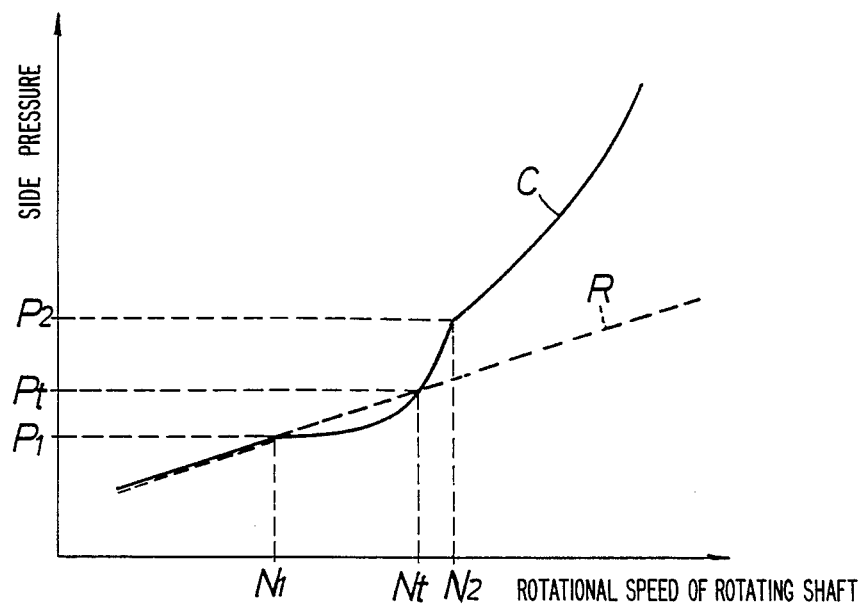
FIG. 4 is a graph illustrating the relationship between the rotational speed of the rotating shaft and the side pressure applied to the V-belt.

The operation of the first preferred embodiment of the present invention is as follows. When the crankshaft or the drive shaft 1 is rotated by operating the engine, and the rotational speed of the drive shaft 1 is gradually increased, a centrifugal force applied to the plural weights 19 is gradually increased to move the weights 19 radially outwardly in the weight receiving chambers 18. As a result, the movable pulley element 11 is moved leftwardly, as viewed in FIG. 1, against the biasing force of the clutch spring 27 until the friction surface $f_2$ of the movable pulley element 11 comes into contact with the side surface of the V-belt 3. The, the V-belt 3 is sandwiched between the fixed and movable pulley elements 7 and 11, and the rotation o the fixed and movable pulley elements 7 and 11 is transmitted to the endless V-belt 3. FIG. 4 shows the relation between a rotational speed N of the rotating shaft 1 and a side pressure P to be applied to the V-belt 3 by the fixed and movable pulley elements 7 and 11. Referring to FIG. 4, the curve C (solid line) is a side pressure line to be obtained by a resultant force from the force due to the wedge effect of the weights 19 and the weight supporting surfaces 16 and 17 and the biasing force of the clutch spring 27, while the straight line R (dashed line) is a side pressure line to be obtained only by the biasing force of the clutch spring 27. At the intersection between a rotational speed $N_1$ and a side pressure $P_1$, the V-belt 3 starts to contact the pulley elements 7 and 11, but the torque of the rotating shaft 1 is not yet transmitted to the V-belt 3. Thereafter, when the rotational speed of the rotating shaft reaches $N_t$, each weight 19 comes into contact with the bent portion 16a of the ramp plate 15 to enter the region of the wedge angle $\theta$. As a result, a high side pressure $P_t$ is generated against the biasing force of the clutch spring 27. Thereafter, when the rotational speed of the rotating shaft 1 reaches $N_2$, each weight 19 comes into contact with the outer inclined surface 16c of the ramp plate 15, thereby rapidly increasing the side pressure to obtain a high side pressure $P_2$. Under this condition, the V-belt 3 is completely engaged with the pulley elements 7 and 11. Thereafter, rotation of the rotating shaft 1 is reliably transmitted through the pulley elements 7 and 11 to the V-belt 3 under the high side pressure.

As described above, the torque of the drive shaft 1 is transmitted through the driving V-pulley $P_1$ and the endless V-belt 3 to the driven V-pulley $P_2$, and is then transmitted through the driven shaft 2 and the reduction gear mechanism 4 to the rear wheel Wr. When the rotational speed of the drive shaft 1 increases, the centrifugal force applied to the weights 19 is increased to further move the weights 19 radially outwardly in the weight receiving chambers 18 and resultantly allow the movable pulley element 11 to be moved leftwardly as viewed in FIG. 1. Contrariwise, when the rotational speed of the drive shaft 1 decreases, the centrifugal force applied to the weights 19 is decreased to move the weights 19 radially inwardly in the weight receiving chambers 18 and resultantly allow the movable pulley element 11 to be moved rightwardly as viewed in FIG. 1. Accordingly, a change in rotational speed of the drive shaft 1 causes a change in contact position of the endless V-belt 3 with respect to the driving and driven V-pulleys $P_1$ and $P_2$, thereby automatically changing a speed ratio of the continuously variable transmission and transmitting the torque of the drive shaft 1 to the driven shaft 2.

Upon engagement of the clutch, the boundary portions between the vertical surface $7_1$ and the conical surface $7_2$ of the friction surface $f_1$ of the driving fixed pulley element 7 and between the vertical surface $11_1$ and the conical surface $11_2$ of the friction surface $f_2$ of the driving movable pulley element 11 are opposed to the opposite side surfaces of the endless V-belt 3. Therefore, the conical surfaces $7_2$ and $11_2$ only come into contact with the side surfaces of the endless V-belt 3. That is, the contact area between the conical surfaces $7_2$ and $11_2$ and the side surfaces of the endless V-belt 3 is radially reduced upon engagement of the clutch. Accordingly, the frictional torque to be transmitted from the V-pulley $P_1$ to the V-belt 3 upon engagement of the clutch is smaller than that in the speed change region after engagement of the clutch. As a result, the contact surface between the V-pulley $P_1$ and the V-belt 3 easily experiences slippage upon initial engagement of the clutch as compared with in the speed change region after engagement of the clutch. On the other hand, upon engagement of the clutch, the fixed and movable pulley elements 30 and 31 of the driven variable-diameter V-pulley $P_2$ are engaged with the opposite side surfaces of the V-belt 3 at the outer peripheral portion where the plural annular grooves 37 and 38 are formed. Accordingly, the contact area between the pulley elements 30 and 31 and the V-belt 3 is radially reduced. As a result, the frictional torque to be transmitted from the V-belt 3 to the driven pulley $P_2$ upon engagement of the clutch is smaller than that in the speed change region after engagement of the clutch. Accordingly, the contact surface between the V-pulley $P_2$ and the V-belt 3 is easily slipped upon engagement of the clutch as compared with in the speed change region after engagement of the clutch.

Thus, the shifting from a no-load condition to a load condition of the belt-type continuously variable transmission, that is, the shifting from a "clutch-off" condition to a "clutch-on" condition is smoothly carried out without shock via a semi-engaged clutch condition where a slight amount of slippage is generated between the drive and driven variable-diameter V-pulleys and the endless V-belt.

Referring next to FIGS. 5 and 6 which show a second preferred embodiment of the present invention, the driven variable-diameter V-pulley $P_2$ is modified. The fixed pulley element 30 and the movable pulley element 31 of the V-pulley $P_2$ are formed at their outer peripheral portions with a plurality of small circular holes 39 arranged at circumferentially equal intervals. Each circular hole 39 has a chamfered circular edge on the side of the contact surfaces between the V-belt 3 and the pulley elements 30 and 31, so as to prevent the V-belt 3 from being caught by the circular edge of the circular hole 39. In the second preferred embodiment, the frictional torque to be transmitted from the endless V-belt 3 to the V-pulley $P_2$ is substantially reduced, thereby exhibiting the same effect as of the first preferred embodiment. The small circular holes 39 of the fixed and movable pulley elements 30 and 31 may, alternatively, be arranged at circumferentially irregular intervals.

Referring to FIGS. 7 and 8, which show a third preferred embodiment of the present invention, low-friction members 40 and 41 such as synthetic resin composite material having a coefficient of friction lower than that of the fixed and movable pulley elements 30 and 31 are fixed to the outer peripheral portions of the fixed and movable pulley elements 30 and 31 along the entire circumference or at circumferential intervals. The inside surfaces of the low-friction members 40 and 41 are substantially flush with the conical friction surfaces $f_3$ and $f_4$ of the fixed and movable pulley elements 30 and 31. In the third preferred embodiment, the frictional force between the fixed pulley element 30 and the endless V-belt 3 and the frictional force between the movable pulley element 31 and the endless V-belt 3 upon engagement of the clutch are reduced more than those in the speed change region after engagement of the clutch, thus exhibiting the same effect as of the first preferred embodiment.

Figure 10:
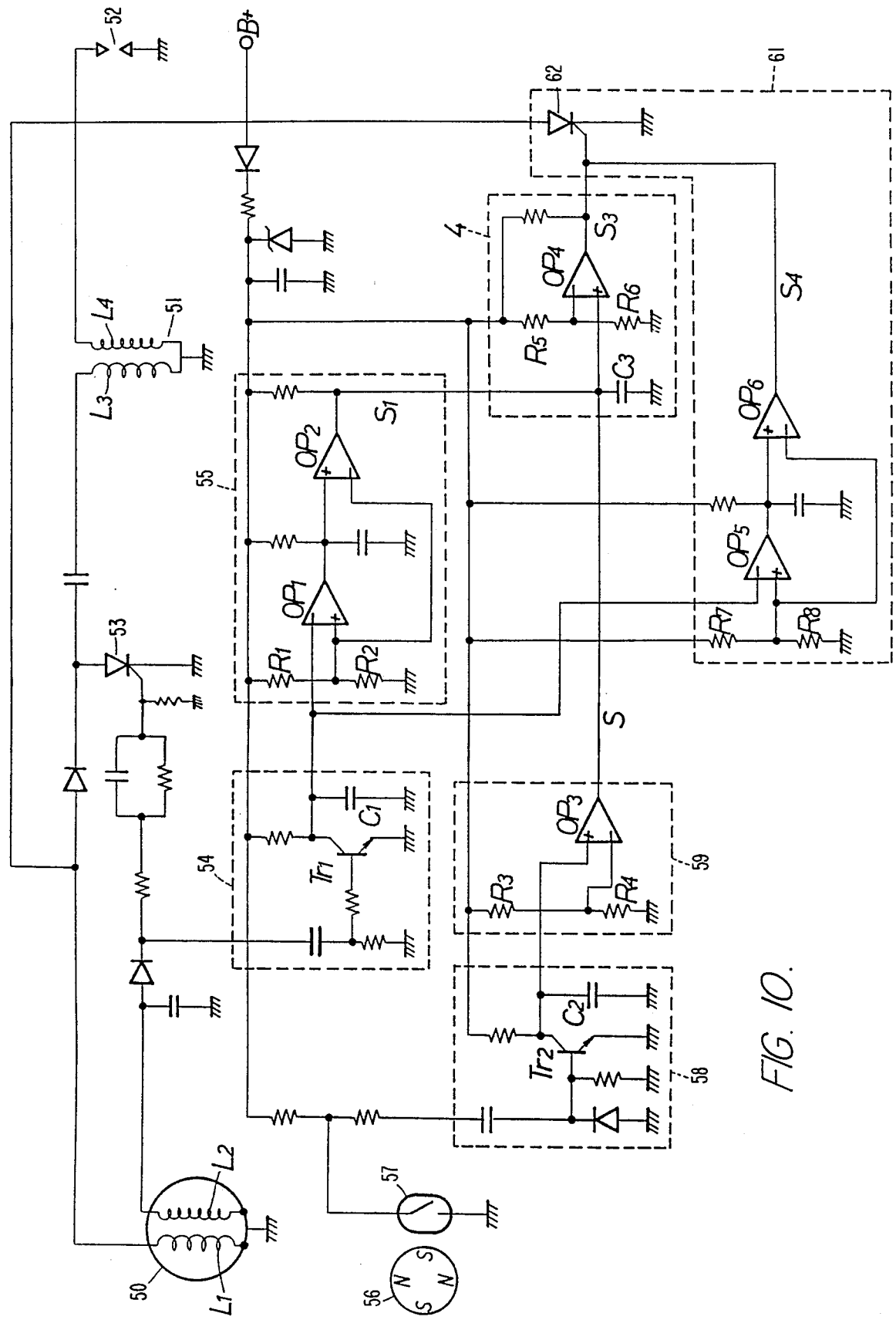
FIG. 10 is a circuit diagram of the electrical circuitry utilized in the practice of the first preferred embodiment of the present invention.
Figure 11:
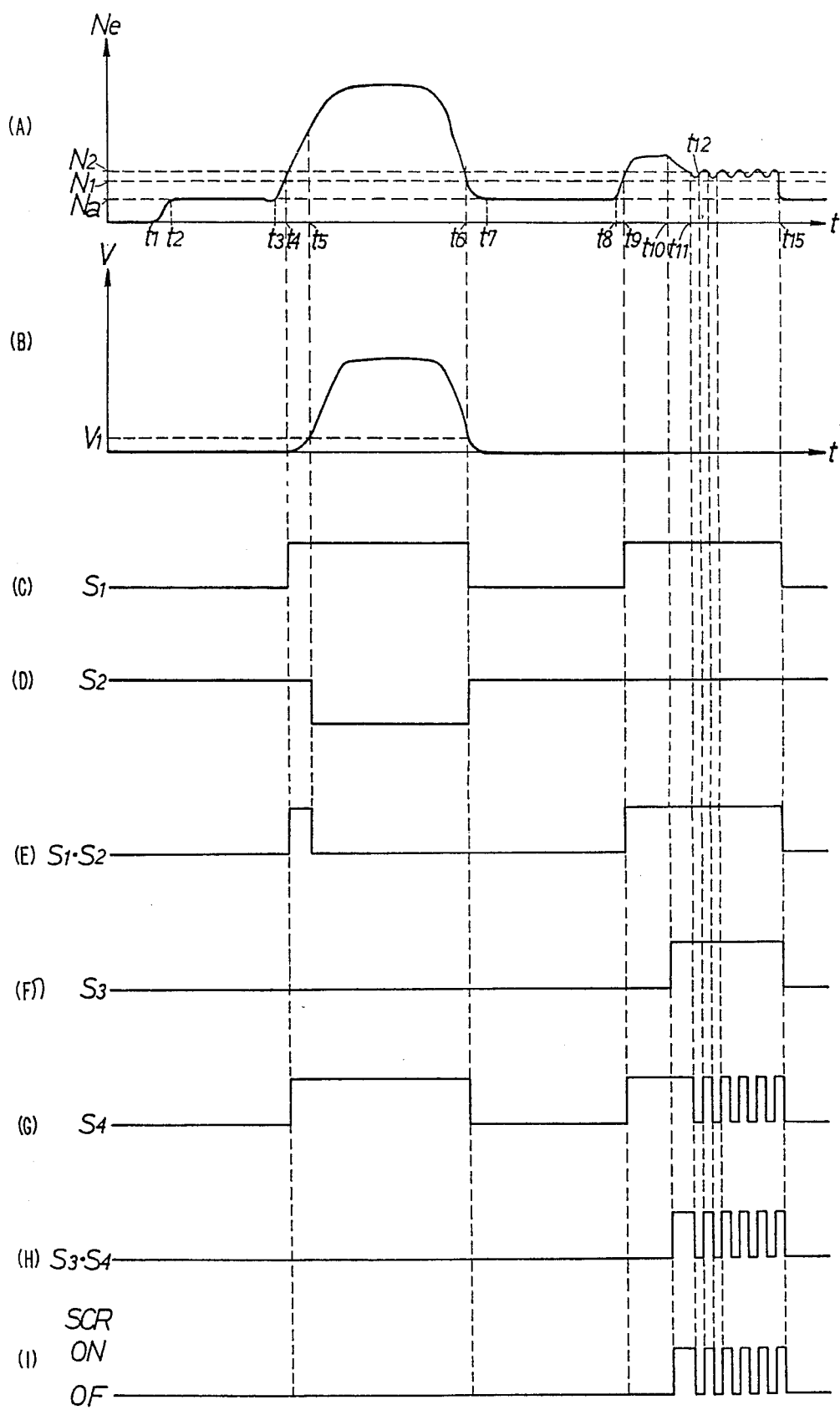
FIG. 11 is a representation of time charts illustrating the operation of the first preferred embodiment of the invention.

In a preferred embodiment of the control aspect of the present invention, which is described with reference to FIGS. 9 to 11, the control device is applied to a motorcycle wherein each function implementation means is formed by an electronic circuit. Referring to FIGS. 9 and 10, there is shown an engine E to generate current in a generating coil $L_1$ of the alternator 50. The current is supplied to a primary coil $L_3$ of an ignition coil 51. A secondary coil $L_4$ of the ignition coil 51 is connected to a spark plug 52. The alternator 50 includes a pulse coil $L_2$ for generating a pulse signal in synchronism with the ignition timing of the engine. The pulse signal is input to a gate terminal of a thyristor 53, and also to an engine speed detecting means 54. The engine speed detecting means 54 includes a transistor $Tr_1$ and a capacitor $C_1$ connected to the transistor $Tr_1$. The capacitor $C_1$ charges a voltage inversely proportional to the frequency of the pulse from the pulse coil $L_2$. An engine speed comparing means 55 includes a comparator $OP_1$ connected at its positive-phase input terminal to resistors $R_1$ and $R_2$, and also a comparator $OP_2$ adapted to generate an output signal $S_1$ when a voltage lower than a divided voltage by the resistors $R_1$ and $R_2$ is input to a negative-phase input terminal of the comparator $OP_1$. A circular magnet 56 is rotatively driven by a speedometer cable, or the like, and a reed switch 57 is turned on and off by the circular magnet 56. The reed switch 57 generates a pulse signal to be input into a load detecting means 58. The load detecting means 58 includes a transistor $Tr_2$ and a capacitor $C_2$ connected to the transistor $Tr_2$. The capacitor $C_2$ charges a voltage inversely proportional to the frequency of the pulse from the reed switch 57. A load comparing means 59 includes a comparator $OP_3$ connected at its negative-phase input terminal to resistors $R_3$ and $R_4$. The comparator $OP_3$ generates an output signal $S_2$ when a voltage higher than the divided voltage by the resistors $R_3$ and $R_4$ is input to the positive-phase input terminal of the comparator $OP_3$. A timer means 60 includes a capacitor $C_3$ adapted to charge a voltage when the signals $S_1$ and $S_2$ are input, and also includes a comparator $OP_4$ connected at its negative-phase input terminal to resistors $R_5$ and $R_6$. The comparator $OP_4$ generates an output signal $S_3$ when the voltage charged by the capacitor $C_3$ becomes higher than the divided voltage by the resistors $R_5$ and $R_{6p}$. An engine speed control means 61 includes a comparator $OP_5$ connected at its positive-phase input terminal to the resistors $R_7$ and $R_8$, a comparator $OP_6$ adapted to generate an output signal $S_4$ when a voltage lower than the divided voltage by resistors $R_7$ and $R_8$ is input to the negative-phase input terminal of the comparator $OP_5$, and a thyristor 12 adapted to receive the signals $S_3$ and $S_4$ at its gate terminal.

The operation of the first preferred embodiment according to this aspect of the invention will be described with reference to the time charts (A) to (I) shown in FIG. 11. FIG. 11(A) shows a change in engine speed Ne with respect to time t. FIG. 11(B) shows a change in vehicle speed V with respect to time t. FIGS. 11(C) and 11(D) show an ON/OFF condition of the signals $S_1$ and $S_2$ (current value) shown in FIG. 10 with respect to time t. FIG. 11(E) shows a charged current of the capacitor $C_3$ shown in FIG. 10 with respect to time t. FIG. 11(F) shows an ON/OFF condition of the signal $S_3$ shown in FIG. 10 with respect to time t. FIG. 11(G) shows an ON/OFF condition of the signal $S_4$ shown in FIG. 10 with respect to time t. FIG. 11(H) shows a voltage at the junction where the signals $S_3$ and $S_4$ shown in FIG. 10 are input with respect to time t; and FIG. 11(I) shows an ON/OFF condition of the thyristor 62 shown in FIG. 10. Referring to FIG. 11(A), the engine is started at the time $t_1$, and is rotated at an idling speed Na during the period from the time $t_2$ to the time $t_3$. During this period, as the clutch gap d is defined between one side surface of the endless V-belt 3 and the movable pulley element assembly 6 as shown in FIGS. 1 and IA, the engine power is not transmitted to the driven shaft 2.

When the engine throttle is opened at the time $t_3$, the engine speed Ne is increased, and exceeds set values $N_1$ and $N_2$ at the time $t_4$. As a result, the movable pulley element assembly 6 is moved toward the fixed pulley element 7 in response to the increase in the engine speed Ne, thereby effecting the "clutch-on" state. Accordingly, the engine power is transmitted from the driving variable-diameter V-pulley $P_1$ through the endless V-belt 3 and the driven variable-diameter V-pulley $P_2$ to the driven shaft 2. As a result, the rear wheel Wr is rotated through the reduction gear mechanism 4 and the rear axle 5, thus increasing the vehicle speed V. In response to further increase in engine speed Ne, the movable pulley element assembly 6 is further moved toward the fixed pulley element 7, the contact area between the driving V-pulley $P_1$ and the endless V-belt 3 being thereby increased in radius. At the same time, since the endless V-belt 3 is wound around the driven variable-diameter V-pulley $P_2$, the movable pulley element 31 is moved away from the fixed pulley element 30 in response to the movement of the movable pulley element assembly 6. As a result, the contact area between the driven V-pulley $P_2$ and the endless V-belt 3 is decreased in radius, thus effecting the continuous speed change operation.

When the rotating speed of the driven shaft 2 is low upon starting the vehicle, or upon braking the rear wheel Wr, the load is large. Therefore, when the vehicle speed V is equal to, or less than, a set value $V_1$ shown in FIG. 11(B), it can be detected that the load is equal to, or greater than, a set value. Accordingly, the load equal to, or greater than, the set value remains applied to the driven shaft 2 until the time $t_5$. As shown in FIGS. 11(C) to 11(G), both the signals $S_1$ and $S_2$ are output during the period from the time $t_4$ to the time $t_5$, when the capacitor $C_3$ shown in FIG. 10 is charged. However, since this period is short, the signal $S_3$ is not output, and, accordingly, the control of engine speed is not carried out during this period. Although a stall condition may occur during this period, this stall condition is minute, or it is a so-called "small stall condition." Further, if the control of engine speed were carried out under such a small stall condition, accelerating operation within the normal operational range would be hindered.

When the vehicle speed V becomes the set value $V_1$ or more at the time $t_5$, the load applied to the driven shaft 2 becomes the set value or less, and accordingly the signal $S_2$ is not output. Further, when the throttle is closed to reduce the vehicle speed V to the set value $V_1$ or less at the time $t_6$, the engine speed Ne becomes the set value $N_1$ or less as shown in FIG. 11(A). Therefore, both the signals $S_1$ and $S_2$ are not simultaneously output as shown in FIGS. 11(C) to 11(E). Accordingly, the control of engine speed is not carried out during the period from the time $t_7$ when the engine speed Ne is reduced to the idling speed Na to the time $t_8$ when the continuation of the idling speed Na is terminated.

When the throttle is opened again at the time $t_8$, the engine speed Ne is increased, and becomes the set value $N_1$ or more at the time $t_9$. At this time, when the rear wheel Wr is hindered from rotating by a braking device to cause a so-called lock condition, for example, and thus the load applied to the driven shaft 2 becomes large, the vehicle speed V remains zero and the signal $S_2$ therefore remains output as shown in FIGS. 11(B) and 11(D). Accordingly, the capacitor $C_3$ shown in FIG. 10 starts to be charged at the time $t_9$ during a set period of time until the time $t_{10}$. At the time $t_{10}$, the terminal voltage of the capacitor $C_3$ exceeds the voltage divided by the resistors $R_5$ and $R_6$, and the signal $S_3$ is therefore output.

Further, as the engine speed Ne remains not less than the set value $N_2$ at the time $t_{10}$, the signal $S_4$ is output as shown in FIG. 11(G). Accordingly, the thyristor 62 is turned on by the voltage at the junction where both the signals $S_3$ and $S_4$ are input. As a result, the current of the generating coil $L_1$ of the alternator 50 is supplied to the thyristor 62, and not to the primary coil $L_3$ of the ignition coil 51. Accordingly, the spark plug 52 is not ignited to cause an unburnt condition of fuel admitted to the engine, resulting in a reduction in engine speed. Therefore, a so-called full stall condition generated at the time $t_9$ is prevented at the time $t_{10}$.

Thereafter, when the engine speed Ne equals the set value $N_2$, or less, at the time $t_{11}$, the output of the signal $S_4$ is terminated, and the thyristor 62 is therefore turned off, as shown in FIGS. 11(G) to 11(I). Accordingly, fuel in the engine is ignited to increase the engine speed Ne. As a result, when the engine speed Ne again equals the set value $N_2$, or more, at the time $t_{12}$, the thyristor 62 is turned on to reduce the engine speed Ne. Such an operation, as mentioned above, is repeated until the time $t_{15}$, so as to maintain the engine speed Ne near the set value $N_2$.

When the engine speed Ne equals the idling speed Na at the time $t_{15}$, the output of the signal $S_1$ is terminated, and the output of the signals $S_3$ and $S_4$ also is terminated. Accordingly, the thyristor 62 is deactivated, and the engine control is terminated to maintain the engine speed at the idling speed Na.

Figure 12:
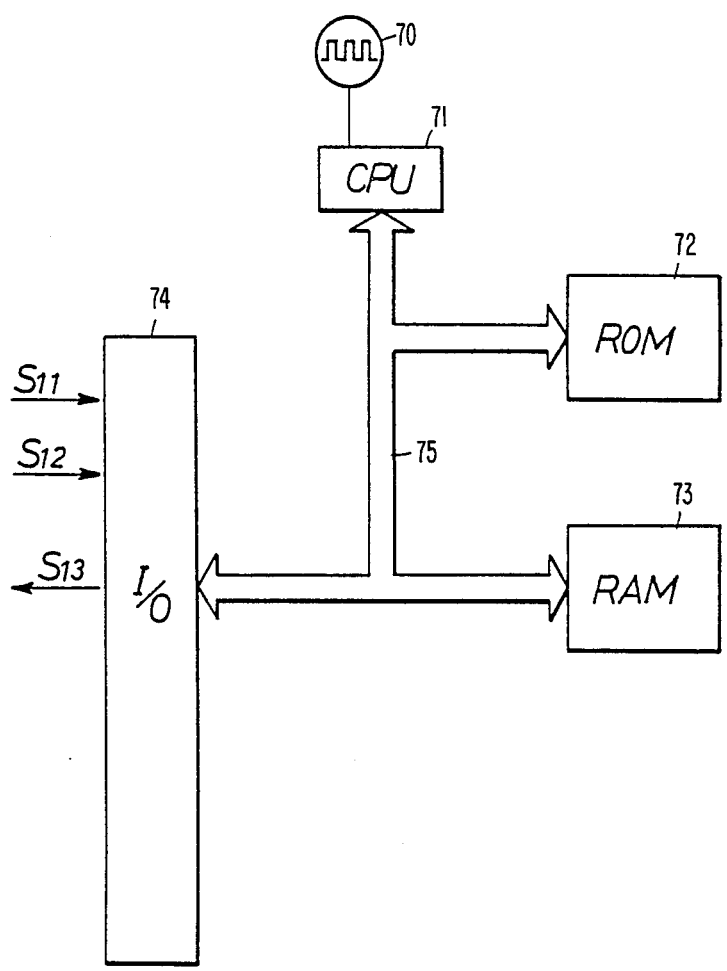
FIG. 12 is a schematic representation of the hardware utilized in practice of the second preferred embodiment of the invention; and, FIGS. 13(A) to 13(D) are flow charts representative of the software of the second preferred embodiment of the invention.
Figure 13:
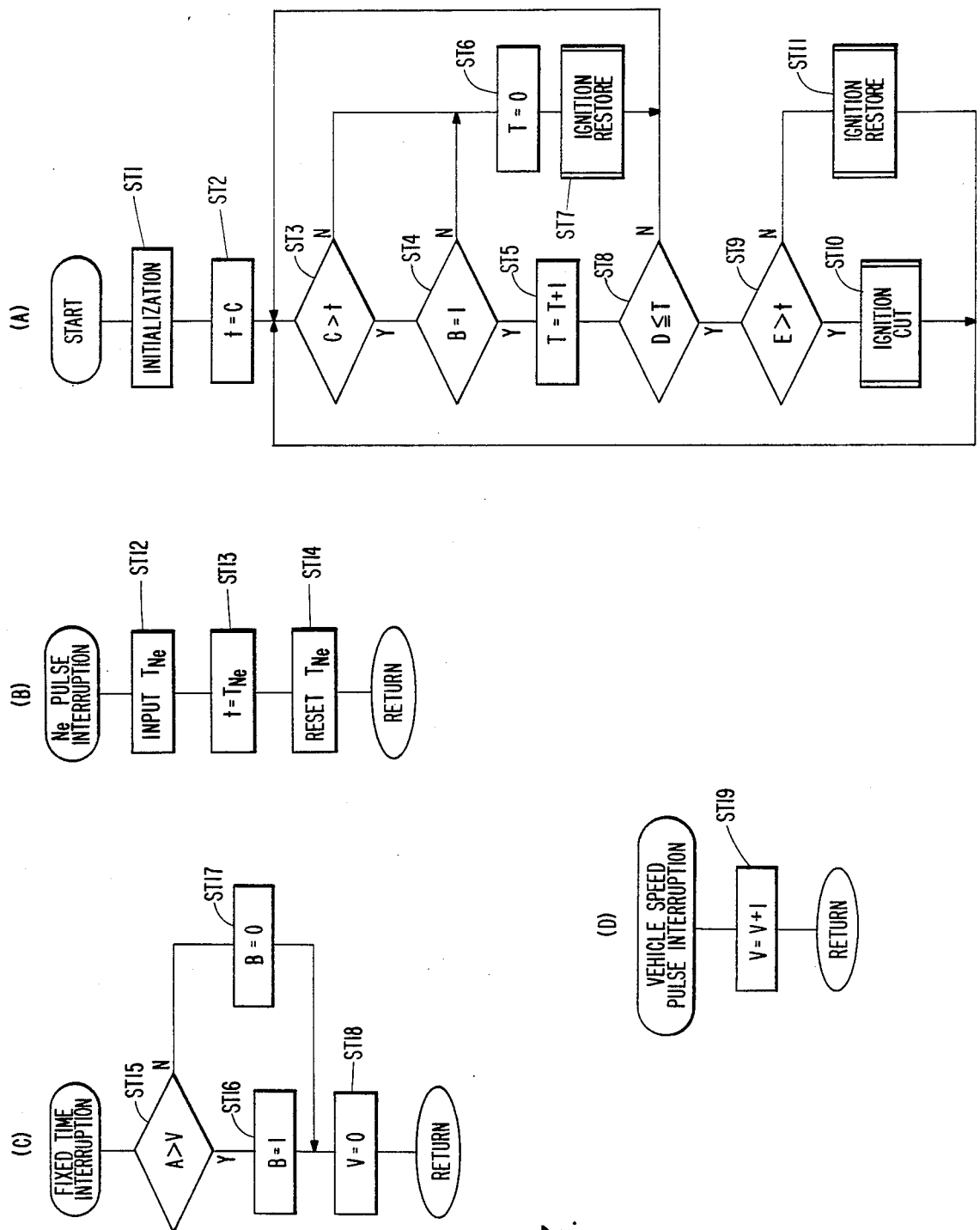

Referring next to FIGS. 12 and 13 which show a second preferred embodiment of the present invention, a microcomputer is employed as the function implementation means in substitution for the electronic circuit of the first preferred embodiment.

FIG. 12 illustrates the hardware of the microcomputer. A pulse generator 70 for generating pulses of a fixed period, and a CPU 71 is operated according to the pulses. The CPU 71 is connected through a bus 75 to a ROM 72, and RAM 73 and an interface 74. The ROM 72 stores the main program, data for initialization and programs for starting interruption processings as shown in FIG. 13(A) to 13(D). The interface 74 inputs a pulse signal $S_{11}$ corresponding to the engine speed Ne and a pulse signal $S_{12}$ corresponding to the vehicle speed V, and outputs a signal $S_{13}$ for controlling engine ignition. The RAM 73 stores data corresponding to these input signals and includes a work area for computation.

The operation of the second preferred embodiment is described with reference to FIGS. 13(A) to 13(D). FIG. 13(A) shows a main program. FIG. 13(B) shows a program for interruption processing when the pulse signal $S_{11}$ corresponding to the engine speed Ne is input. FIG. 13(C) shows a program for interruption processing to be executed every fixed time; and FIG. 13(D) shows a program for interruption processing when the pulse signal $S_{12}$ corresponding to the vehicle speed V is input.

Referring to FIG. 13(A), the program starts to initialize in step ST1 various data such as vehicle speed $V=0$, parameter $B=0$ (which is set to 1 when the vehicle speed is not greater than a set value), parameter $T=0$ corresponding to time, parameter A corresponding to the set value $V_1$ of the vehicle speed, parameter C corresponding to the set value $N_1$ of the engine speed Ne, parameter D corresponding to the set period of time, and parameter E corresponding to the set value $N_2$ of the engine speed Ne. These parameters A, C, D and E are set to constants.

In step ST2, parameter t is set to C. Prior to the explanation of step ST3 and the subsequent steps, there will be described how each parameter is updated by the interruption processing shown in FIGS. 13(B) to 13(D). FIG. 13(B) is a flow chart of the program for executing the interruption processing when the pulse signal $S_{11}$ corresponding to the engine speed Ne is input. Referring to FIG. 13(B), the period of the pulse signal $S_{11}$ is obtained according to the pulse generated from the pulse generator 70 to set to $T_{Ne}$ in step ST12. Then, the parameter t is set to $T_{Ne}$ in step ST13, and thereafter $T_{Ne}$ is reset in step ST14 to end the interruption processing and return to the main program.

FIG. 13(C) is a flow chart of the program for executing the interruption processing every fixed time. Referring to FIG. 13(C), the determination of $A>V$ is executed in step ST15. According to the result of the determination, the program proceeds to the step ST15 or ST17 and set $B=1$ or $B=0$. Then, $V=0$ is set in step ST18 to end the interruption processing and return to the main program.

FIG. 13(D) is a flow chart of the program for executing the interruption processing when the pulse signal $S_{12}$ corresponding to the vehicle speed is input. Referring to FIG. 13(D), the operation of $V=V+1$ is executed at step ST19 to end the interruption processing and return to the main program.

Accordingly, as a result of these interruption processings, t is set to a period corresponding to the engine speed Ne, and V is set to a value corresponding to the vehicle speed, and B is set to 1 when the vehicle speed is not greater than a set value.

Returning to the main program, the determination of $C>t$ is executed in step ST3, and according to the result of the determination, the program proceeds to step ST4 or step ST6. In step ST4, the determination of $B=1$ is executed, and according to the result of the determination, the program proceeds to step ST5 or to step ST6. In step ST5, the parameter T corresponding to the time is updated to $T+1$. In step ST6, the parameter T is reset to $T=0$. If the engine E is unburnt in step ST7, the signal $S_{13}$ shown in FIG. 12 is output so as to restore ignition, and the program is returned to step ST3. On the other hand, the determination of $D<=T$ is executed in step ST8, and according to the result of the determination, the program is returned to step ST3, or its proceeds to step ST9. In step ST9, the determination of $E>6$ is executed, and according to the result of the determination, the program proceeds to step ST10 or step ST11. In step ST10, ignition of the engine is cut, while in step ST11, ignition is restored. Then, the program is returned to step ST3 to continue the control.

Consequently, ignition of the engine is cut when the following conditions are satisfied. First, when the period t of the engine speed Ne is less than the parameter C corresponding to the set value $N_1$, that is, when the engine speed Ne is not less than the set value $N_1$. Secondly, when $B=1$ is held, that is, when the vehicle speed V is not greater than the set value. Thirdly, when $D<=T$ is held, that is, when the time reaches the set period of time. And fourthly, when $E>t$ is held, that is, when the engine speed Ne is not less than the set value $N_2$. Accordingly, the engine speed is reduced to thereby prevent the duration of a full stall condition for an extended period of time.

While the specific preferred embodiments have been described, it is to be understood that the present invention is not limited to the preferred embodiments, but various modifications may be made without departing from the scope of the claims. For example, although the relationship between the set values $N_1$ and $N_2$ of the engine speed Ne is $N_1 < N_2$ in the aforementioned preferred embodiments, the relationship may be change into $N_1 > N_2$. In this case, the ratio of resistances of the resistors $R_1$ and $R_2$ in FIG. 2 of the first preferred embodiment may be made variable according to the output of the signal, and the signal is output at an engine speed lower than the set value $N_2$. Further, in the flow chart shown in FIG. 6A of the second preferred embodiment, the parameter F, corresponding to a period of engine speed lower than the set value $N_2$, is compared with the parameter t between the step ST9 and the step ST11, and, if $F > t$ is held, the program may proceed to step ST11, while, if $F > 6$ is not held, the program may be returned to step ST6. Furthermore, the program may be returned from step ST10 or ST11 to step ST4.

Further, although the ignition circuit is controlled by the engine speed control means in the preferred embodiments, the input of the engine fuel quantity may alternatively be controlled.

It should be further understood that, although a preferred embodiment of the invention has been illustrated and described herein, changes and modifications can be made in the described arrangement without departing from the scope of the appended claims.

We claim:

1. A belt-type continuously variable transmission comprising a variable-diameter V-pulley provided with a fixed pulley element and a movable pulley element on a drive shaft and a driven variable-diameter V-pulley provided with a fixed pulley element and a movable pulley element on a driven shaft, an endless V-belt wound around said V-pulleys, and a clutch spring provided in said driving variable-diameter V-pulley for biasing said movable pulley element in such a direction as to move away from said endless belt and thereby define a clutch gap between contact surfaces of said movable pulley element and said endless belt, wherein the frictional contact area between said driving and driven variable-diameter V-pulleys and said endless V-belt comprises a clutch operation portion for effecting clutch control between said V-pulleys and said endless belt and a speed change operation portion for effecting speed change control between said V-pulleys and said endless V-belt and wherein said clutch operation portion contains means for generating slippage more easily than said speed change operation portion.

2. The continuously variable transmission according to claim 1 wherein said pulley elements include a conically-formed surface portion conforming substantially to the angular taper of said belt and said slippage generating means comprises means for reducing frictional contact between said pulley elements and said belt in said clutch operation portion of said pulleys.

3. The continuously variable transmission according to claim 2 wherein said frictional contact reducing means comprises a portion of the contact surface of said pulley elements being angularly offset from said conical portions thereof.

4. The continuously variable transmission according to claim 2 in which said angularly offset portion of said contact surface extends radially inwardly from said conically-formed surface.

5. The continuously variable transmission according to claim 4 in which said angularly offset portion of said contact surface extends substantially perpendicularly with respect to the axis of said shaft.

6. The continuously variable transmission according to any one of claims 3, 4 or 5 in which said frictional contact reducing means is on said driving pulley.

7. The continuously variable transmission according to claim 2 wherein said frictional contact reducing means comprises a plurality of annular grooves formed in the surface of said pulley elements.

8. The continuously variable transmission according to claim 2 wherein said frictional contact reducing means comprises a plurality of circumferentially spaced openings formed in the surface of said pulley elements.

9. The continuously variable transmission according to claim 2 wherein said frictional contact reducing means comprises the provision of reduced friction members in the surface of said pulley elements.

10. The continuously variable transmission according to any one of claims 7 to 9 in which said frictional contact reducing means are disposed on the conically-formed surface of said pulley elements in radially spaced relation from the speed change portion thereby.

11. The continuously variable transmission according to claim 10 in which said pulley elements from said driven pulley and said speed change portion is disposed radially inwardly from said frictional contact reducing means.

* * * * *

UNITED STATES PATENT AND TRADEMARK OFFICE
CERTIFICATE OF CORRECTION

PATENT NO. : 4,925,432

DATED : May 15, 1990

INVENTOR(S) : Yukio MIYAMARU et al.

It is certified that error appears in the above-identified patent and that said Letters Patent is hereby corrected as shown below:

In claim 4 (column 16, line 16) delete "2" and insert therefor -- 3 --.

Signed and Sealed this

Sixth Day of August, 1991

Attest:

HARRY F. MANBECK, JR.

Attesting Officer

Commissioner of Patents and Trademarks